(12) United States Patent
Kim et al.

(10) Patent No.: US 9,025,515 B2
(45) Date of Patent: May 5, 2015

(54) METHOD FOR TRANSMITTING SIGNALS IN A COMMUNICATION SYSTEM INCLUDING A RELAY STATION

(75) Inventors: Hak Seong Kim, Anyang-si (KR); Han Byul Seo, Anyang-si (KR); Ki Jun Kim, Anyang-si (KR)

(73) Assignee: LG Electronics Inc., Seoul (KR)

( * ) Notice: Subject to any disclaimer, the term of this patent is extended or adjusted under 35 U.S.C. 154(b) by 132 days.

(21) Appl. No.: 13/820,422

(22) PCT Filed: Aug. 23, 2011

(86) PCT No.: PCT/KR2011/006215
§ 371 (c)(1),
(2), (4) Date: Mar. 1, 2013

(87) PCT Pub. No.: WO2012/030098
PCT Pub. Date: Mar. 8, 2012

(65) Prior Publication Data
US 2013/0163509 A1   Jun. 27, 2013

Related U.S. Application Data

(60) Provisional application No. 61/380,193, filed on Sep. 3, 2010, provisional application No. 61/391,079, filed on Oct. 8, 2010.

(51) Int. Cl.
*H04W 88/04* (2009.01)
*H04L 5/00* (2006.01)
*H04B 7/155* (2006.01)

(52) U.S. Cl.
CPC ............. *H04L 5/0057* (2013.01); *H04W 88/04* (2013.01); *H04L 5/0007* (2013.01); *H04L 5/0092* (2013.01); *H04B 7/15542* (2013.01)

(58) Field of Classification Search
CPC ... H04L 5/0023; H04L 5/0048; H04L 5/0053; H04L 1/0026; H04L 5/0057
USPC .......................................... 370/329, 315, 260
See application file for complete search history.

(56) References Cited

U.S. PATENT DOCUMENTS

| 2009/0264123 A1 | 10/2009 | Agashe et al. | |
| 2010/0080166 A1* | 4/2010 | Palanki et al. | 370/315 |
| 2012/0039270 A1* | 2/2012 | Nguyen et al. | 370/329 |
| 2012/0113914 A1* | 5/2012 | Zhao et al. | 370/329 |
| 2013/0107735 A1* | 5/2013 | Hoymann et al. | 370/252 |

FOREIGN PATENT DOCUMENTS

| KR | 1020100018453 | 2/2010 |
| WO | 2010039003 | 4/2010 |

* cited by examiner

*Primary Examiner* — Charles C Jiang
*Assistant Examiner* — Will Lin
(74) *Attorney, Agent, or Firm* — Lee, Hong, Degerman, Kang & Waimey

(57) ABSTRACT

Provided is a method for transmitting signals in a relay station. In detail, the method for transmitting signals in a relay station of a wireless communication system using a plurality of subframes including a plurality of OFDM symbols or SC-FDMA symbols comprises the steps of: receiving bitmap information on a backhaul downlink subframe from the relay station; obtaining control information on a subframe that is not used for a backhaul downlink; and repeatedly transmitting channel state information to the relay station on the basis of a virtual index indicating only a backhaul uplink subframe, wherein the backhaul uplink subframe is determined according to the control information and the bitmap information.

4 Claims, 10 Drawing Sheets

FIG. 7

| Subframe index | 0 | 1 | 2 | 3 | 4 | 5 | 6 | 7 | 8 | 9 | 0 | 1 | 2 | 3 | 4 | 5 | 6 | 7 | 8 | 9 | 0 | 1 | 2 | 3 | 4 | 5 | 6 | 7 | 8 | 9 |
|---|---|---|---|---|---|---|---|---|---|---|---|---|---|---|---|---|---|---|---|---|---|---|---|---|---|---|---|---|---|---|
| New UL Subframe index | | | | | | | | 0 | | | | 1/2 | | | 3/4 | | | | | 5 | | | | | | | 6 | | |
| FBI transmission with 5ms periodicity configuration | | | | | | | | FBI | | | | | | | | | | | | FBI | | | | | | | | | |

FIG. 8

| Subframe index | 0 | 1 | 2 | 3 | 4 | 5 | 6 | 7 | 8 | 9 | 0 | 1 | 2 | 3 | 4 | 5 | 6 | 7 | 8 | 9 | 0 | 1 | 2 | 3 | 4 | 5 | 6 | 7 | 8 | 9 | 0 | 1 | 2 | 3 | 4 | 5 | 6 | 7 | 8 | 9 |
|---|---|---|---|---|---|---|---|---|---|---|---|---|---|---|---|---|---|---|---|---|---|---|---|---|---|---|---|---|---|---|---|---|---|---|---|---|---|---|---|---|
| New UL Subframe index | | | | | | | | 0 | | | | 1 | 2 | | | 3 | 4 | | | | 5 | | | | | | | 6 | | | | | | | | | | | | |
| FBI transmission with 5ms periodicity configuration | | | | | | | | FBI | | | | FBI | | | | | FBI | | | | | | | | | | | FBI | | | | | | | | | | | | |

FIG. 9

| Subframe index | 0 | 1 | 2 | 3 | 4 | 5 | 6 | 7 | 8 | 9 | 10 (0) | 11 (1) | 12 (2) | 13 (3) | 14 (4) | 15 (5) | 16 (6) | 17 (7) | 18 (8) | 19 (9) | 20 (0) | 21 (1) | 22 (2) | 23 (3) | 24 (4) | 25 (5) | 26 (6) | 27 (7) | 28 (8) | 29 (9) |
|---|---|---|---|---|---|---|---|---|---|---|---|---|---|---|---|---|---|---|---|---|---|---|---|---|---|---|---|---|---|---|
| non-MBSFN subframe | 0 | | | | 4 | 5 | | | | 9 | 0 | | | | 4 | 5 | | | | 9 | 0 | | | | 4 | 5 | | | | 9 |
| Un DL subframe pattern | X | 0 | 0 | 1 | X | 0 | 0 | 1 | 1 | 0 | 0 | 1 | 1 | 0 | X | X | X | 0 | 0 | X | X | 0 | 0 | 1 | X | 0 | 0 | 1 | 1 | 0 |
| Un UL subframe pattern | | | | | | | | 1 | | | | 1 | 1 | | | 1 | 1 | | | 1 | 1 | | | | | | | 1 | | |
| FBI transmission with 5ms periodicity configuration | FBI | | | | FBI | | | FBI | | | FBI | FBI | | | FBI | | | | | FBI | | | | | FBI | | | FBI | | |

METHOD FOR TRANSMITTING SIGNALS IN A COMMUNICATION SYSTEM INCLUDING A RELAY STATION

CROSS-REFERENCE TO RELATED APPLICATIONS

This application is the National Stage filing under 35 U.S.C. 371 of International Application No. PCT/KR2011/006215, filed on Aug. 23, 2011, which claims the benefit of U.S. Provisional Application Ser. No. 61/380,193, filed on Sep. 3, 2010, and U.S. Provisional Application Ser. No. 61/391,079, filed on Oct. 8, 2010, the contents of which are all hereby incorporated by reference herein in their entirety.

BACKGROUND

1. Technical Field

The present invention relates to a communication technique, and more particularly, to a transmitter and a receiver in a wireless communication system.

2. Discussion of the Related Art

Standardization works of international mobile telecommunication (IMT)-advanced which is a next generation (i.e., post $3^{rd}$ generation) mobile communication system are carried out in the international telecommunication union radio communication sector (ITU-R). The IMT-advanced aims to support an Internet protocol (IP)-based multimedia service with a data transfer rate of 1 Gbps in a stationary or slowly moving state or 100 Mbps in a fast moving state.

$3^{rd}$ generation partnership project (3GPP) is a system standard satisfying requirements of the IMT-advanced, and prepares LTE-advanced which is an improved version of long term evolution (LTE) based on orthogonal frequency division multiple access (OFDMA)/single carrier-frequency division multiple access (SC-FDMA) transmission. The LTE-advanced is one of promising candidates for the IMT-advanced. A relay station technology is one of main technologies for the LTE-advanced.

A relay station is a device for relaying a signal between a base station and a user equipment, and is used for cell coverage extension and throughput enhancement of a wireless communication system.

A transmission format such as a transmission mode of a downlink channel is used for communication between the relay station and the base station. A communication connection cannot be maintained when information regarding the transmission format is not correctly delivered to the relay station, the base station, the user equipment, or the like. Therefore, there is a need for a communication method for correctly delivering the transmission format by considering an operation characteristic of the relay station, the base station, and the user equipment.

SUMMARY

The following technology provides a method of transmitting a channel status.

Based on the following examples, a method of transmitting a signal from a relay station in a radio communication system that uses a plurality of subframes including multiple OFDM symbols or SC-FDMA symbols is provided. In detail, the method comprises: receiving bitmap information regarding backhaul downlink subframes from a base station; obtaining control information for subframes that are not used for a backhaul downlink; and repeatedly transmitting channel status information to the base station based on virtual indexes indicating only backhaul uplink subframes, wherein the backhaul uplink subframes are determined depending on the control information and the bitmap information.

Additionally or alternatively, virtual indexes of subframes used for transmitting the channel status information are periodically selected.

Additionally or alternatively, a period of the virtual indexes is indicated by RRC signaling.

Additionally or alternatively, the backhaul uplink subframes include uplink subframes corresponding to remaining subframes other than downlink subframes indicated by the control information among the backhaul downlink subframes Additionally or alternatively, the channel status information includes an SR(Scheduling Request), a CQI (Channel Quality Indicator), an RI (Rank Indicator), a PMI (Precoding Matrix Indicators), and an SRS (Sounding Reference Signal).

Additionally or alternatively, the bitmap information is transmitted through RRC signaling.

Additionally or alternatively, the control information indicates non-MBSFN (Multicast Broadcast Single Frequency Network) subframes.

Additionally or alternatively, Additionally or alternatively, a method of transmitting a signal from a relay station in a radio communication system that uses a plurality of subframes including multiple OFDM symbols or SC-FDMA symbols is further provided. The method comprises: receiving bitmap information regarding backhaul downlink subframes from a base station; obtaining control information for subframes that are not used for a backhaul downlink; in a case where one of a plurality of backhaul uplink subframes is indicated by a subframe index for channel status information, transmitting the channel status information to the base station through the subframe indicated by the subframe index; and in a case where the subframe indicated by the subframe index for the channel status information is not one of the plurality of backhaul uplink subframes, transmitting the channel status information to the base station through a subframe closest to the subframe indicated by the subframe index of the plurality of backhaul uplink subframes, wherein the plurality of backhaul uplink subframes are determined depending on the control information and the bitmap information Additionally or alternatively, the subframe index for the channel status information is periodically selected Additionally or alternatively, the subframe index for the channel status information is indicated by RRC signaling Additionally or alternatively, the plurality of backhaul uplink subframes include uplink subframes corresponding to remaining downlink subframes other than downlink subframes indicated by the control information among the backhaul downlink subframes.

Additionally or alternatively, in a case where the subframe indicated by the subframe index for the channel status information is not one of the plurality of backhaul uplink subframes, the channel status information is transmitted through a subframe positioned next to the subframe indicated by the subframe index among the plurality of backhaul uplink subframes.

Additionally or alternatively, the channel status information includes an SR(Scheduling Request), a CQI (Channel Quality Indicator), an RI (Rank Indicator), a PMI (Precoding Matrix Indicators), and an SRS(Sounding Reference Signal).

Additionally or alternatively, the control information indicates non-MBSFN (Multicast Broadcast Single Frequency Network) subframes.

Additionally or alternatively, a relay station in a radio communication system that uses a plurality of subframes including multiple OFDM symbols or SC-FDMA symbols is provided. The relay station comprising a RF unit configured to: receive bitmap information regarding backhaul downlink subframes from a base station; obtain control information for subframes that are not used for a backhaul downlink; and repeatedly transmit channel status information to the base station based on virtual indexes indicating only backhaul uplink subframes, wherein the backhaul uplink subframes are determined depending on the control information and the bitmap information.

Additionally or alternatively, a relay station in a radio communication system that uses a plurality of subframes including multiple OFDM symbols or SC-FDMA symbols is provided. The relay station comprising a RF unit configured to: receive bitmap information regarding backhaul downlink subframes from a base station; obtain control information for subframes that are not used for a backhaul downlink; in a case where one of a plurality of backhaul uplink subframes is indicated by a subframe index for channel status information, transmit the channel status information to the base station through the subframe indicated by the subframe index; and in a case where the subframe indicated by the subframe index for the channel status information is not one of the plurality of backhaul uplink subframes, transmit the channel status information to the base station through a subframe closest to the subframe indicated by the subframe index of the plurality of backhaul uplink subframes, wherein the plurality of backhaul uplink subframes are determined depending on the control information and the bitmap information.

According to the technical features described in the detailed description, channel status information may be efficiently transmitted. By doing so, performance may be enhanced.

BRIEF DESCRIPTION OF THE DRAWINGS

FIGS. 7 and 8 illustrate an example of transmitting channel status information (CSI) based on a virtual index.

FIG. 9 illustrates another example of transmitting channel status information.

DESCRIPTION OF THE EMBODIMENTS

The technology described below can be used in various wireless communication systems such as code division multiple access (CDMA), frequency division multiple access (FDMA), time division multiple access (TDMA), orthogonal frequency division multiple access (OFDMA), single carrier frequency division multiple access (SC-FDMA), etc. The CDMA can be implemented with a radio technology such as universal terrestrial radio access (UTRA) or CDMA2000. The TDMA can be implemented with a radio technology such as global system for mobile communications (GSM)/general packet ratio service (GPRS)/enhanced data rate for GSM evolution (EDGE). The OFDMA can be implemented with a radio technology such as institute of electrical and electronics engineers (IEEE) 802.11 (Wi-Fi), IEEE 802.16 (WiMAX), IEEE 802.20, evolved UTRA (E-UTRA), etc. The UTRA is a part of a universal mobile telecommunication system (UMTS). $3^{rd}$ generation partnership project (3GPP) long term evolution (LTE) is a part of an evolved UMTS (E-UMTS) using the E-UTRA. The 3GPP LTE uses the OFDMA in a downlink and uses the SC-FDMA in an uplink. LTE-advance (LTE-A) is an evolution of the 3GPP LTE. Although 3GPP LTE/LET-A is exemplified in the following description for clarity of explanation, technical features of the present invention are not limited thereto.

Figure 1:
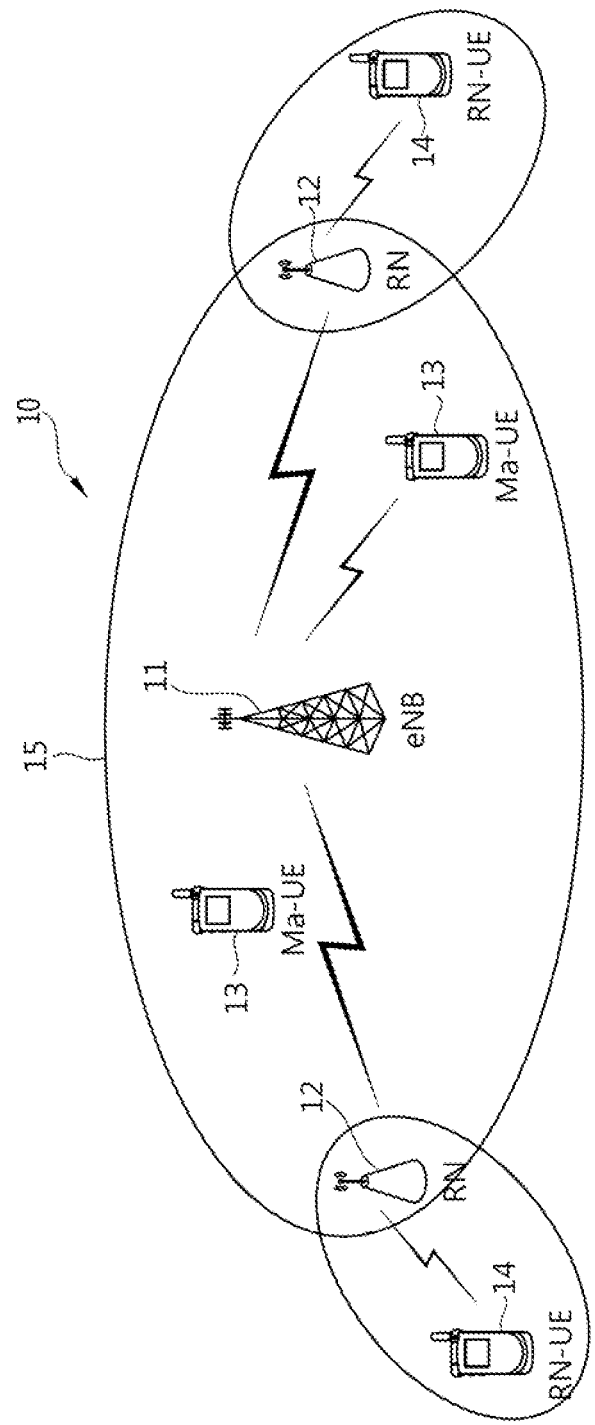
FIG. 1 illustrates a radio communication system including a relay station.

FIG. 1 shows a wireless communication system employing a relay node (RN).

Referring to FIG. 1, a wireless communication system 10 employing an RN 12 includes at least one eNodeB (eNB) 11. Each eNB 11 provides a communication service to a specific geographical region 15 generally referred to as a cell. The cell may be divided into a plurality of regions, and each region may be referred to as a sector. One or more cells may exist in the coverage of one eNB. The eNB 11 is generally a fixed station that communicates with a user equipment (UE) 13 and may be referred to as another terminology, such as a base station (BS), a base transceiver system (BTS), an access point, an access network (AN), etc. The eNB 11 may perform functions such as connectivity between the RN 12 and a UE 14, management, control, resource allocation, etc.

The RN 12 is a device for relaying a signal between the eNB 11 and the UE 14, and is also referred to as another terminology such as a relay station (RS), a repeater, a relay, etc. A relay scheme used in the RN may be either amplify and forward (AF) or decode and forward (DF), and the technical features of the present invention are not limited thereto.

The UEs 13 and 14 may be fixed or mobile, and may be referred to as another terminology, such as a mobile station (MS), a user terminal (UT), a subscriber station (SS), a wireless device, a personal digital assistant (PDA), a wireless modem, a handheld device, an access terminal (AT), etc. Hereinafter, a macro-UE (Ma-UE) 13 denotes a UE which communicates directly with the eNB 11, and a relay node-UE (RN-UE) 14 denotes a UE which communicates with the RN. To improve a data transfer rate depending on a diversity effect, the Ma-UE 13 located in the cell of the eNB 11 can also communicate with the eNB 11 via the RN 12.

A link between the eNB 11 and the Ma-UE 13 may be called a macro link. The macro link may be divided into a macro downlink (M-DL) and a macro uplink (M-UL). The M-DL denotes communication from the eNB 11 to the Ma-UE 13. The M-UL denotes communication from the Ma-UE 13 to the eNB 11.

A link between the eNB 11 and the RN 12 may be called a backhaul link. The backhaul link may be divided into a backhaul downlink (B-DL) and a backhaul uplink (B-UL). The B-DL denotes communication from the eNB 11 to the RN 12. The B-UL denotes communication from the RN 12 to the eNB 11.

A link between the RN 12 and the RN-UE 14 may be called an access link. The access link may be divided into an access downlink (A-DL) and an access uplink (A-UL). The A-DL denotes communication from the RN 12 to the RN-UE 14. The A-UL denotes communication from the RN-UE 14 to the RN 12.

The wireless communication system 10 employing the RN is a system supporting bidirectional communication. The bidirectional communication may be performed by using a time division duplex (TDD) mode, a frequency division duplex (FDD) mode, etc. When in the TDD mode, UL transmission and DL transmission use different time resources. When in the FDD mode, UL transmission and DL transmission use different frequency resources.

Figure 2:
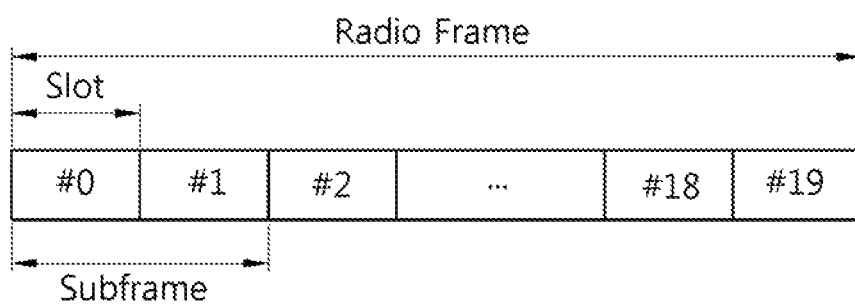
FIG. 2 illustrates a radio frame structure in 3GPP LTE.

FIG. 2 shows a radio frame structure of 3GPP LTE.

Referring to FIG. 2, a radio frame consists of 10 subframes. One subframe consists of 2 slots. One subframe may have a length of 1 millisecond (ms), and one slot may have a length of 0.5 ms. A time for transmitting one subframe is defined as a transmission time interval (TTI). The TTI may be a minimum unit of scheduling.

One slot may include a plurality of orthogonal frequency division multiplexing (OFDM) symbols in a time domain. Since the 3GPP LTE uses OFDMA in DL transmission, the OFDM symbol is for representing one symbol period, and may be referred to as other terms. For example, the OFDM symbol may also be referred to as an SC-FDMA symbol when SC-FDMA is used as a UL multiple-access scheme. Although it is described herein that one slot includes 7 OFDM symbols, the number of OFDM symbols included in one slot may change depending on a cyclic prefix (CP) length. According to 3GPP TS 36.211 V8.5.0(2008-12), one subframe includes 7 OFDM symbols in case of a normal CP, and includes 6 OFDM symbols in case of an extended CP. The radio frame structure is for exemplary purposes only, and thus the number of subframes included in the radio frame and the number of slots included in the subframe may change variously.

The radio frame structure of FIG. 2 may be found in the sections 4.1 and 4.2 of 3GPP TS 36.211 V8.3.0 (2008-05) "Technical Specification Group Radio Access Network; Evolved Universal Terrestrial Radio Access (E-UTRA); Physical Channels and Modulation (Release 8)".

Figure 3:
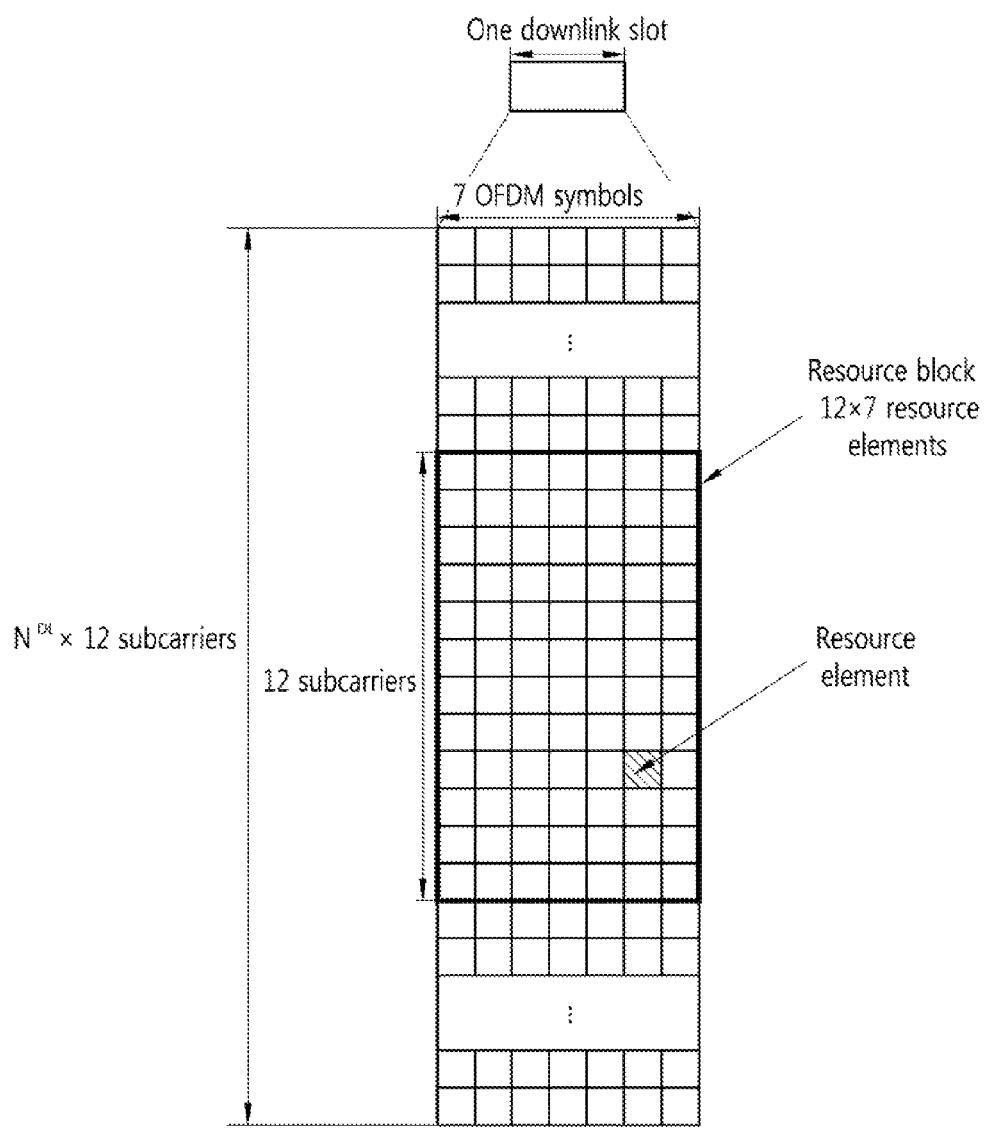
FIG. 3 is a view illustrating an example of a resource grid for a single downlink slot.

FIG. 3 shows an example of a resource grid for one DL slot.

In FDD and TDD radio frames, one slot includes a plurality of orthogonal frequency division multiplexing (OFDM) symbols in a time domain and a plurality of resource blocks (RBs) in a frequency domain. Hereinafter, a symbol may imply one OFDM symbol or one SC-FDMA symbol. The RB is a unit of resource allocation, and includes a plurality of consecutive subcarriers in one slot.

Referring to FIG. 3, a slot (e.g., a DL slot included in a DL subframe) includes a plurality of OFDM symbols in a time domain. It is described herein that one DL slot includes 7 OFDMA symbols and one RB includes 12 subcarriers in a frequency domain for exemplary purposes only, and thus the present invention is not limited thereto. In the RB, a subcarrier may have a spacing of 15 kHz, for example.

Each element on the resource grid is referred to as a resource element (RE), and one RB includes 12×7 REs. The number NDL of RBs included in the DL slot depends on a DL transmission bandwidth determined in a cell. The aforementioned resource grid described in FIG. 3 is also applicable to a UL slot.

Figure 4:
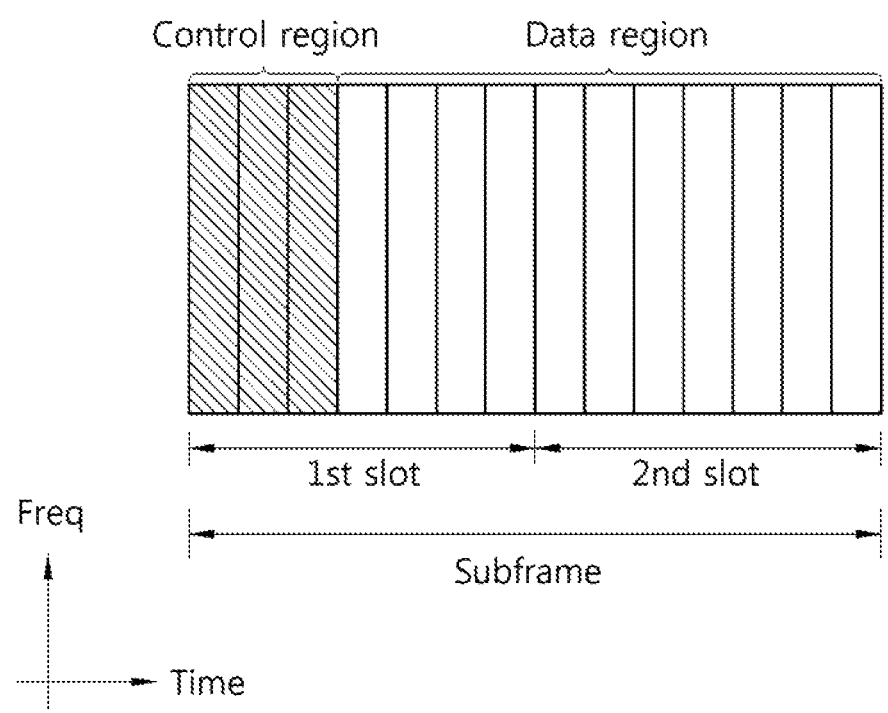
FIG. 4 illustrates a structure of a downlink subframe between a base station and a terminal.

FIG. 4 shows a DL subframe structure between an eNB and a UE.

Referring to FIG. 4, a subframe includes two consecutive slots. In the subframe, up to three preceding OFDM symbols of a 1st slot correspond to a control region to which a physical downlink control channel (PDCCH) is allocated, and the remaining OFDM symbols correspond to a data region to which a physical downlink shared channel (PDSCH) is allocated. A control channel such as a physical control format indicator channel (PCFICH), a physical hybrid-ARQ indicator channel (PHICH), etc., may be allocated to the control region in addition to the PDCCH. The UE may read data information transmitted through the PDSCH by decoding control information transmitted through the PDCCH.

The number of OFDM symbols to which the PDCCH is allocated is variable. In addition, additional control information may be included in the data region to which the PDSCH is allocated.

The control region consists of a plurality of control channel elements (CCEs), i.e., a logical CCE stream. The CCE stream denotes a set of all CCEs constituting the control region in one subframe. The CCE corresponds to a plurality of resource element groups (REGs). For example, the CCE may correspond to 9 REGs. The REG is used to define mapping of a control channel to a resource element. For example, one REG may consist of four resource elements.

A plurality of PDCCHs may be transmitted in the control region. The PDCCH carries control information such as scheduling allocation. The PDCCH is transmitted on an aggregation of one or several consecutive CCEs. A PDCCH format and the number of available PDCCH bits are determined according to the number of CCEs constituting the CCE aggregation. The number of CCEs used for PDCCH transmission is referred to as a CCE aggregation level. In addition, the CCE aggregation level is a CCE unit for searching for the PDCCH. A size of the CCE aggregation level is defined by the number of contiguous CCEs. For example, the CCE aggregation level may be an element of $\{1, 2, 4, 8\}$.

Control information transmitted through the PDCCH is referred to as downlink control information (DCI). The DCI includes uplink scheduling information (i.e., an uplink grant), downlink scheduling information (i.e., a downlink grant), system information, an uplink power control command, control information for paging, control information for indicating a random access channel (RACH) response, etc.

Examples of a DCI format include a format 0 for scheduling of a physical uplink shared channel (PUSCH), a format 1 for scheduling of one physical downlink shared channel (PDSCH) codeword, a format 1A for compact scheduling of the one PDSCH codeword, a format 1B for simple scheduling for rank-1 transmission of a single codeword in a spatial multiplexing mode, a format 1C for significantly compact scheduling of a downlink shared channel (DL-SCH), a format 1D for scheduling of the PDSCH in a multi-user spatial multiplexing mode, a format 2 for scheduling of the PDSCH in a closed-loop spatial multiplexing mode, a format 2A for scheduling of the PDSCH in an open-loop spatial multiplexing mode, a format 3 for transmission of a transmission power control (TPC) command for 2-bit power control for the PUCCH and the PUSCH, and a format 3A for transmission of a TPC command for 1-bit power control for the PUCCH and the PUSCH.

Figure 5:
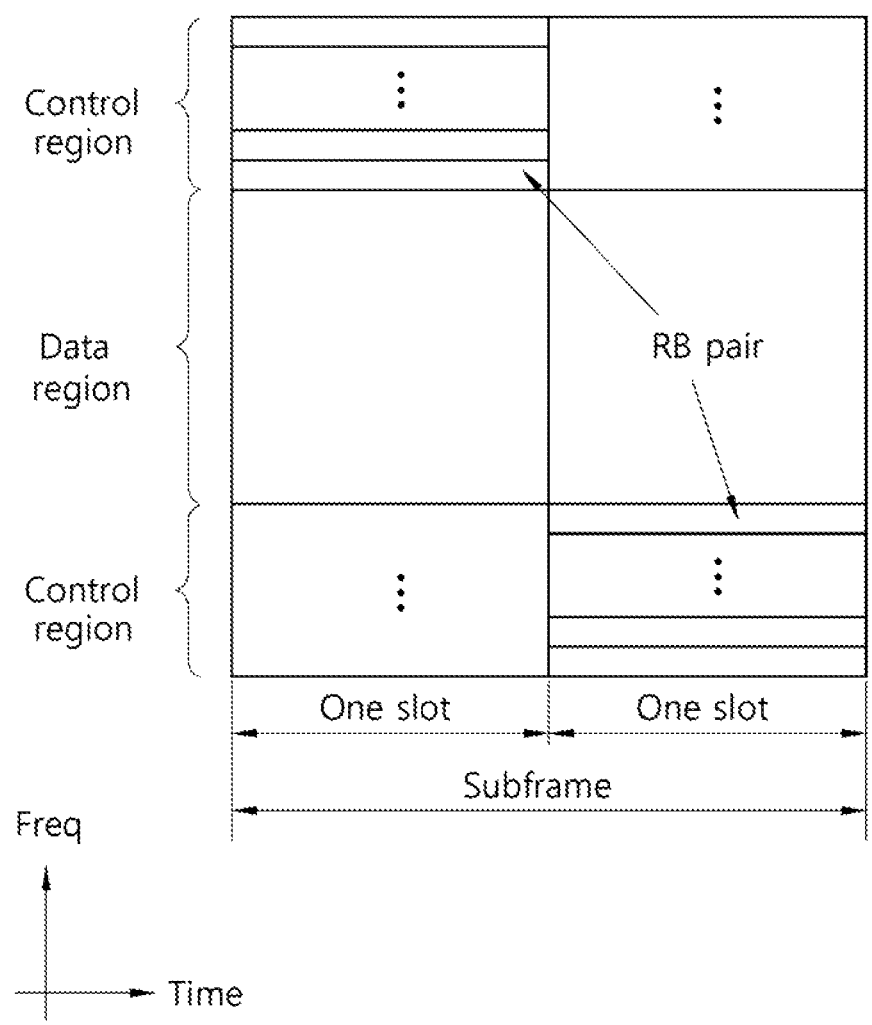
FIG. 5 illustrates a structure of an uplink subframe between a base station and a terminal.

FIG. 5 shows a UL subframe structure between an eNB and a UE.

Referring to FIG. 5, a UL subframe may be divided into a control region and a data region. The control region is a region to which a physical uplink control channel (PUCCH) for carrying UL control information is allocated. The data region is a region to which a physical uplink shared channel (PUSCH) for carrying user data is allocated.

The PUCCH for one UE is allocated in a pair of RBs. The RBs belonging to the RB pair occupy different subcarriers in each of two slots. This is called that the RB pair allocated to the PUCCH is frequency-hopped in a slot boundary.

The PUCCH may support multiple formats. That is, UL control information having a different number of bits for each subframe may be transmitted according to a modulation scheme. For example, when using a binary phase shift keying (BPSK) (i.e., a PUCCH format 1a), 1-bit UL control information may be transmitted through the PUCCH, and when using quadrature phase shift keying (QPSK) (i.e., a PUCCH format 1b), 2-bit UL control information may be transmitted through the PUCCH. In addition thereto, examples of the PUCCH format include a format 1, a format 2, a format 2a, a format 2b, etc. This may be found in the section 5.4 of 3GPP TS 36.211 V8.2.0 (2008-03) "Technical Specification Group Radio Access Network; Evolved Universal Terrestrial Radio Access (E-UTRA); Physical Channels and Modulation (Release 8)".

Hereinafter, channel status information (CSI) is described. The channel status information means various types of control information reported through an uplink for downlink scheduling. The channel status information (CSI) includes a CQI (Channel Quality Indicator), a PMI (Precoding Matrix Indicators), a RI (Rank Indicator), an SR(Scheduling Request), and an SRS(Sounding Reference Signal).

According to the conventional standards, the channel status information may be periodically transmitted through PUCCH (Physical Uplink Control CHannel) format 2. Specifically, the channel status information may be transmitted through PUCCH at the period of 2 ms, 5 ms, or 10 ms.

Hereinafter, a subframe for a backhaul link is described. As described above, the backhaul link refers to a link between a base station and a relay station. Since all subframes are not used for backhaul, information indicating which subframe is to be used for backhaul is included in information regarding backhaul subframe assignment. Specifically, the base station may transmit information regarding backhaul downlink subframes as shown in Table 1 through bitmap information.

TABLE 1

| Decimal equivalent of SubframeConfigurationFDD | Number of uplink HARQ processes |
| --- | --- |
| 1, 2, 4, 8, 16, 32, 64, 128 | 1 |
| 3, 5, 6, 9, 10, 12, 17, 18, 20, 24, 33, 34, 36, 40, 48, 65, 66, 68, 72, 80, 96, 129, 130, 132, 136, 144, 160, 192 | 2 |
| 7, 11, 13, 14, 19, 21, 22, 25, 26, 28, 35, 37, 38, 41, 42, 44, 49, 50, 52, 56, 67, 69, 70, 73, 74, 76, 81, 82, 84, 85, 88, 97, 98, 100, 104, 112, 131, 133, 134, 137, 138, 140, 145, 146, 148, 152, 161, 162, 164, 168, 170, 176, 193, 194, 196, 200, 208, 224 | 3 |
| 15, 23, 27, 29, 30, 39, 43, 45, 46, 51, 53, 54, 57, 58, 60, 71, 75, 77, 78, 83, 86, 87, 89, 90, 91, 92, 93, 99, 101, 102, 105, 106, 107, 108, 109, 113, 114, 116, 117, 120, 135, 139, 141, 142, 147, 149, 150, 153, 154, 156, 163, 165, 166, 169, 171, 172, 173, 174, 177, 178, 180, 181, 182, 184, 186, 195, 197, 198, 201, 202, 204, 209, 210, 212, 213, 214, 216, 218, 225, 226, 228, 232, 234, 240 | 4 |
| 31, 47, 55, 59, 61, 62, 79, 94, 95, 103, 110, 111, 115, 118, 119, 121, 122, 123, 124, 125, 143, 151, 155, 157, 158, 167, 175, 179, 183, 185, 187, 188, 189, 190, 199, 203, 205, 206, 211, 215, 217, 219, 220, 221, 222, 227, 229, 230, 233, 235, 236, 237, 238, 241, 242, 244, 245, 246, 248, 250 | 5 |
| 63, 126, 127, 159, 191, 207, 223, 231, 239, 243, 247, 249, 251, 252, 253, 254, 255 | 6 |

As shown in Table 1, 8 bits of bitmap (corresponding to decimal numbers 0 to 255) information may be transmitted through RRC (Radio Resource Control) signaling. That is, part of the 8 bit bitmap, which is marked with '1', may be used as the backhaul downlink subframe. On the other hand, when the 8 bit bitmap is received, the number of uplink HARQ processes may be determined through the received 8 bit bitmap. The above-described scheme may be applicable to an FDD type of subframe.

Figure 6:
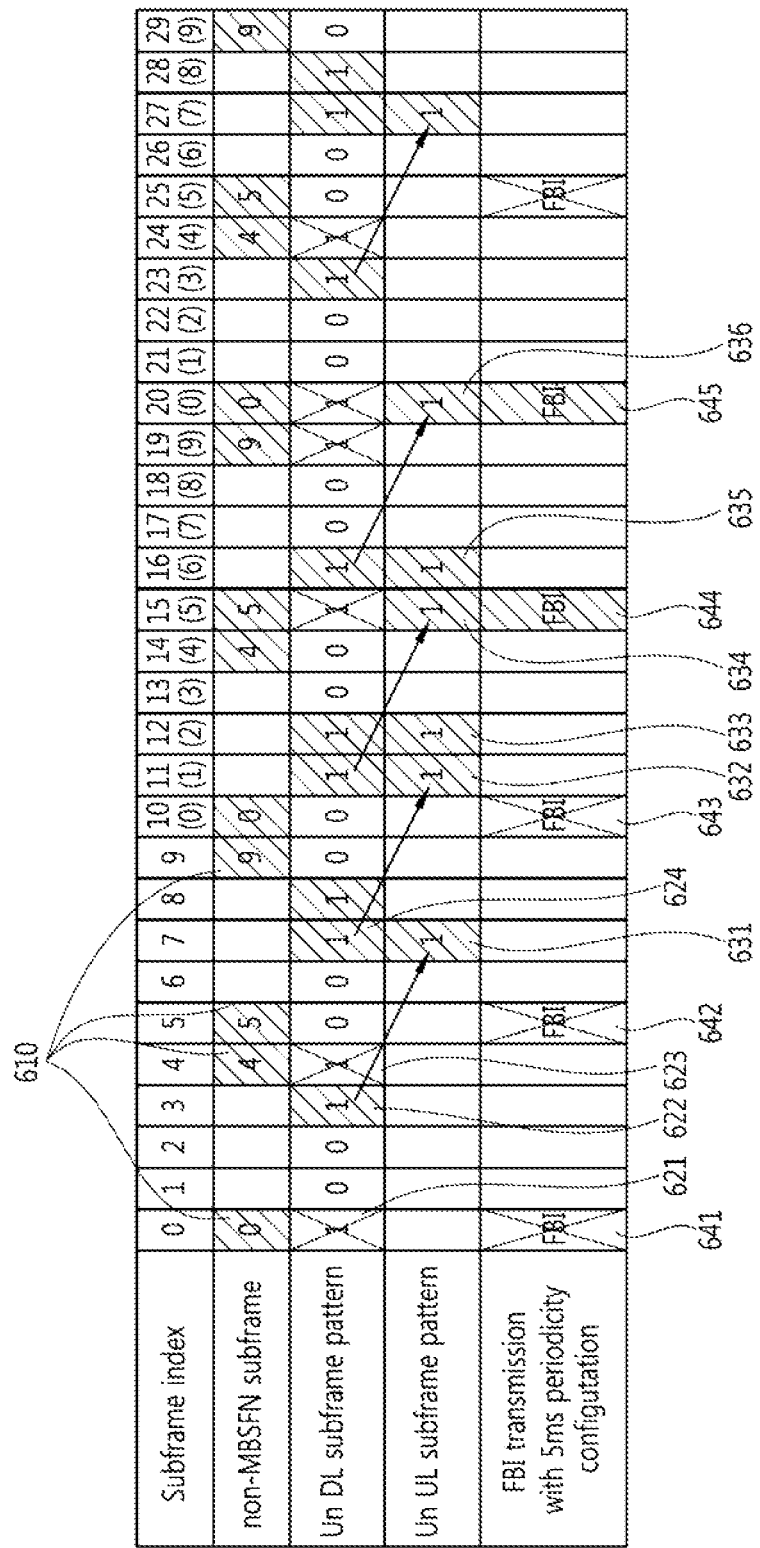
FIG. 6 illustrates an example of a method of transmitting channel status information.

FIG. 6 illustrates an example of a method of transmitting channel status information. Although the example of FIG. 6 is involved in a method of transmitting channel status information through a link between a relay station and a base station, that is, a backhaul link (or Un link), the example of FIG. 6 may be also applicable to a link between a terminal and a base station.

The channel status information is transmitted through backhaul uplink subframes. The backhaul uplink subframes include uplink subframes corresponding to the remaining subframes other than non-MBSFN subframes of backhaul downlink subframes indicated by the bitmap. Hereinafter, the backhaul uplink subframes are described below in greater detail.

As described above, one radio frame includes 10 subframes. In such case, the subframes may have subframe indexes 0 to 9, respectively. The indexes of the second and third radio frames indicated in the example of FIG. 6 are marked with 10 to 29 for ease of description, but each thereof corresponds one of to 0 to 9.

As illustrated, there may be a subframe that is not used for backhaul downlink, that is, non-MBSFN (Multicast Broadcast Single Frequency Network) subframe. In other words, subframes corresponding to indexes 0, 4, 5, and 9 are not used for backhaul downlink. The relay station may obtain control information for the subframes that are not used for backhaul downlink in various ways.

The relay station receives bitmap information regarding the downlink subframes 621, 622, 623, and 624. The bitmap information may include n bits (e.g., 8 bits). As illustrated, in case '10011001' is received, subframes with indexes 0, 3, 4, 5, and 7, respectively, are assigned as backhaul downlink subframes 621, 622, 623, and 624.

In case some or all of the backhaul downlink subframes 621, 622, 623, and 624 correspond to the above-described non-MBSFN subframes 610, uplink subframes 631 and 632 corresponding to the remainder of the subframes 621, 622, 623, and 624 become uplink subframes that may be used in the relay station. In the example of FIG. 6, the channel status information (CSI) is transmitted through uplink subframes 631 and 632 corresponding to the remaining subframes 622 and 624 other than the non-MBSFN subframe 610 of the backhaul downlink subframes 621, 622, 623, and 624.

In 3GPP LTE or LTE-A systems, in case the index of a downlink subframe through which UL-Grant (Uplink-grant) is transmitted is k, the index of an uplink subframe corresponding thereto may be determined as k+4, and thus, uplink subframes 631 and 632 corresponding to the downlink subframes 622 and 624 may have an offset of 4.

Meanwhile, although a downlink subframe is assigned by the bitmap information, in case no scheduling grant is transmitted through a specific downlink subframe, no channel status information (CSI) may be transmitted through an uplink subframe corresponding to the corresponding downlink subframe. For example, although the subframe 624 is assigned through the bitmap information, if no scheduling grant is included in the subframe 624, the subframe 632 may not be determined as the backhaul uplink subframes.

As described above, in case backhaul uplink subframes 631 and 632 are chosen depending on the control information for the subframe 610 that is not used for backhaul downlink and the backhaul downlink subframes 621, 622, 623, and 624 indicated by the bitmap information, virtual indexes may be applicable to the backhaul uplink subframes 631 and 632.

The virtual indexes mean indexes indicating only the backhaul uplink subframes 631, 632, 633, 634, 635, and 636. That is, although the index of the subframe 631 is 7, the virtual index may be determined as 0.

An example of FIG. 6 suggests a method of repeatedly transmitting channel status information (CSI) based on virtual indexes of backhaul uplink subframes 631, 632, 633, 634,

635, and 636. That is, the channel status information (CSI) is repeatedly transmitted based not on the conventional indexes (hereinafter, referred to as "actual indexes") but on virtual indexes. In such case, the virtual indexes of the backhaul uplink subframes 631, 632, 633, 634, 635, and 636 used for transmitting the channel status information may be periodically selected. In other words, the backhaul uplink subframes may be selected so that the interval between the virtual indexes is constant. For example, subframes 631, 633, and 635 may be selected (the period is determined as 2 based on the virtual indexes), or subframes 631 and 634 may be selected (the period is determined as 3 based on the virtual indexes).

According to the conventional standards, the channel status information is periodically transmitted based on the conventional indexes, i.e., actual indexes. However, in case the channel status information is selected based on the actual indexes, when subframes where the channel status information is to be transmitted are not used as backhaul links or correspond to non-MSBSFN subframes 610, the corresponding information cannot be transmitted. Accordingly, it is preferred to repeatedly transmit channel status information based on the virtual indexes.

In general, the period and offset used for periodically transmitting channel status information are as follows. Table 2 concerns SR (Scheduling Request). As shown in Table 2, a period in which channel status information (e.g., SR) is transmitted is determined through RRC signaling. That is, a period in which channel status information (i.e., SR) is transmitted (i.e., $SR_{PERIODICITY}$) is determined through $I_{SR}$ received through RRC signaling. However, if according to $I_{SR}$, channel status information is transmitted based on the conventional indexes, the channel status information is not transmitted according to the first scheduled period due to subframes that are not used for a backhaul link. For example, as shown in FIG. 6, although RRC signaling is done so that FBI is transmitted at the period of 5 ms, unless subframes 641, 642, and 643 assigned for FBI are assigned for backhaul uplink, the FBI cannot be transmitted according to the intended period. That is, the FBI is transmitted through some subframes 644 and 645 but may not be transmitted at the period of 5 ms.

Accordingly, subframes that are not provided for backhaul link are all removed while sequential indexes (i.e., virtual indexes) are assigned to subframes only for the backhaul link, and the period (i.e., $SR_{PERIODITY}$) and offset (i.e., $N_{OFFSET, SR}$) may be determined based on the virtual indexes. In such case, subframes for the backhaul link may be constituted differently for each relay station, and thus, the offset may be of no technological importance. Further, $I_{SR}$ may be limited only to 0, 5, 15, 35, 75, 155, and 157. In such scenario, the signaling overhead may be reduced to 3 bits. Further, all of the subframes used for the backhaul link may be used for channel status information (CSI). In such case, $SR_{PERIODICITY}$ and $N_{OFFSET, SR}$ may include other types of control information.

TABLE 2

| SR configuration Index $I_{SR}$ | SR periodicity (ms) $SR_{PERIODICITY}$ | SR subframe offset $N_{OFFSET,SR}$ |
|---|---|---|
| 0-4 | 5 | $I_{SR}$ |
| 5-14 | 10 | $I_{SR}$ − 5 |
| 15-34 | 20 | $I_{SR}$ − 15 |
| 35-74 | 40 | $I_{SR}$ − 35 |
| 75-154 | 80 | $I_{SR}$ − 75 |
| 155-156 | 2 | $I_{SR}$ − 155 |
| 157 | 1 | $I_{SR}$ − 157 |

The description of Table 2 may also be applicable to Table 3 below. That is, the technical features for SR (Scheduling Request) may also be applicable to CQI (Channel Quality Indicator) and PMI (Precoding Matrix Indicators).

TABLE 3

| $I_{CQI/PMI}$ | Value of $N_p$ | Value of $N_{OFFSET,CQI}$ |
|---|---|---|
| 0 ≤ $I_{CQI/PMI}$ ≤ 1 | 2 | $I_{CQI/PMI}$ |
| 2 ≤ $I_{CQI/PMI}$ ≤ 6 | 5 | $I_{CQI/PMI}$ − 2 |
| 7 ≤ $I_{CQI/PMI}$ ≤ 16 | 10 | $I_{CQI/PMI}$ − 7 |
| 17 ≤ $I_{CQI/PMI}$ ≤ 36 | 20 | $I_{CQI/PMI}$ − 17 |
| 37 ≤ $I_{CQI/PMI}$ ≤ 76 | 40 | $I_{CQI/PMI}$ − 37 |
| 77 ≤ $I_{CQI/PMI}$ ≤ 156 | 80 | $I_{CQI/PMI}$ − 77 |
| 157 ≤ $I_{CQI/PMI}$ ≤ 316 | 160 | $I_{CQI/PMI}$ − 157 |
| $I_{CQI/PMI}$ = 317 | | Reserved |
| 318 ≤ $I_{CQI/PMI}$ ≤ 349 | 32 | $I_{CQI/PMI}$ − 318 |
| 350 ≤ $I_{CQI/PMI}$ ≤ 413 | 64 | $I_{CQI/PMI}$ − 350 |
| 414 ≤ $I_{CQI/PMI}$ ≤ 541 | 128 | $I_{CQI/PMI}$ − 414 |
| 542 ≤ $I_{CQI/PMI}$ ≤ 1023 | | Reserved |

Table 3 may be applicable to FDD frames, and Table 4 may be applicable to TDD frames. The description of Table 2 may be also applicable to Table 4 below.

TABLE 4

| $I_{CQI/PMI}$ | Value of $N_p$ | Value of $N_{OFFSET,CQI}$ |
|---|---|---|
| $I_{CQI/PMI}$ = 0 | 1 | $I_{CQI/PMI}$ |
| 1 ≤ $I_{CQI/PMI}$ ≤ 5 | 5 | $I_{CQI/PMI}$ − 1 |
| 6 ≤ $I_{CQI/PMI}$ ≤ 15 | 10 | $I_{CQI/PMI}$ − 6 |
| 16 ≤ $I_{CQI/PMI}$ ≤ 35 | 20 | $I_{CQI/PMI}$ − 16 |
| 36 ≤ $I_{CQI/PMI}$ ≤ 75 | 40 | $I_{CQI/PMI}$ − 36 |
| 76 ≤ $I_{CQI/PMI}$ ≤ 155 | 80 | $I_{CQI/PMI}$ − 76 |
| 156 ≤ $I_{CQI/PMI}$ ≤ 315 | 160 | $I_{CQI/PMI}$ − 156 |
| 316 ≤ $I_{CQI/PMI}$ ≤ 1023 | | Reserved |

The description of Table 2 may also be applicable to Table 5 below. That is, the technical features of SR (Scheduling Request) may also be applicable to RIs (Rank Indicators).

TABLE 5

| $I_{CQI/PMI}$ | Value of $N_p$ | Value of $N_{OFFSET,CQI}$ |
|---|---|---|
| $I_{CQI/PMI}$ = 0 | 1 | $I_{CQI/PMI}$ |
| 1 ≤ $I_{CQI/PMI}$ ≤ 5 | 5 | $I_{CQI/PMI}$ − 1 |
| 6 ≤ $I_{CQI/PMI}$ ≤ 15 | 10 | $I_{CQI/PMI}$ − 6 |
| 16 ≤ $I_{CQI/PMI}$ ≤ 35 | 20 | $I_{CQI/PMI}$ − 16 |
| 36 ≤ $I_{CQI/PMI}$ ≤ 75 | 40 | $I_{CQI/PMI}$ − 36 |
| 76 ≤ $I_{CQI/PMI}$ ≤ 155 | 80 | $I_{CQI/PMI}$ − 76 |
| 156 ≤ $I_{CQI/PMI}$ ≤ 315 | 160 | $I_{CQI/PMI}$ − 156 |
| 316 ≤ $I_{CQI/PMI}$ ≤ 1023 | | Reserved |

As described above, in case virtual indexes are used, a period may be designated such that subframes not performing backhaul transmission are removed while meaningful subframes (that is, subframes performing backhaul transmission) only are used.

Meanwhile, a process of configuring virtual indexes from conventional indexes may be as follows. First, of subframes designated according to bitmap information, all subframes that cannot be used for a backhaul link, such as non-MBSFN subframes, real MBSFN subframes, and positioning reference symbol subframes, may be taken away. As another method, an HARQ process ID used for identifying an HARQ process may be used to configure virtual indexes so that only subframes participating in actual transmission are included in the virtual indexes.

FIGS. 7 and 8 illustrate an example of transmitting channel status information (CSI) based on virtual indexes. FIGS. 7 and 8 illustrate an example in which subframes 0, 4, 5, and 9 cannot be used for a backhaul downlink and in which 10011001 is received as bitmap information. As described above, the period of channel status information may be determined through RRC signaling. For example, in case channel status information is transmitted at the period of 5 ms through RRC signaling as in the example of FIG. 7, FBI is transmitted through subframes with virtual indexes 0 and 5, respectively. In such case, the channel status information (or FBI) is actually transmitted at an interval larger than 5 ms. Accordingly, when virtual indexes are used, the period indicated through RRC signaling may be determined as a smaller one. By doing so, the period actually transmitted may be adjusted.

FIG. 8 shows an example in which channel status information (or FBI) is transmitted at the period of 2 ms through RRC signaling. As shown, FBI may be transmitted through subframes with virtual indexes 0, 2, 4, and 6, respectively.

Hereinafter, a method of transmitting channel status information (CSI) in a different way from the above-described method is described. FIG. 9 illustrates another example of transmitting channel status information.

As described above, subframes 0, 4, 5, and 9 may be subframes that are not used for a backhaul downlink. Further, the relay station may receive bitmap information '10011001' from the base station. By doing so, subframes '7', '11', '12', '15', '16', '20', and '27' may be determined as backhaul uplink subframes as described above.

Meanwhile, as described above, channel status information (CSI) may be determined to be transmitted at a specific period through RRC signaling. That is, a period related to channel status information may be determined through data such as $I_{SR}$. If as shown in FIG. 9 the channel status information is determined to have a period of 5 ms, the subframe indexes for the channel status information may be determined as '0', '5', '10', '15', '20', and '25'.

Subframes indicated by subframe indexes '0', '5', '10', '15', '20', and '25' for channel status information may not be one of backhaul uplink subframes '7', '11', '12', '15', '16', '20', and '27'. In case subframes indicated by the subframe indexes for the channel status information are not backhaul uplink subframes, the channel status information may be transmitted through a closest subframe. If the subframe index for the channel status information is k, the closest subframe may be selected only from subframes having indexes larger than k. That is, the closest subframe may be a subframe positioned later. FIG. 9 illustrates an example of determining the closest subframe according to the above method. Unlike this, the closest subframe may be selected only from subframes having indexes smaller than k. That is, the closest subframe may be a subframe positioned earlier.

As illustrated in FIG. 9, in case subframe indexes for channel status information are 15 and 20, the channel status information (e.g., FBI) may be transmitted through subframes indicated by the corresponding indexes. However, unless subframes indicated by the subframe indexes for the channel status information are backhaul uplink subframes (subframes '7', '11', '12', '15', '16', '20', and '27'), the channel status information is transmitted through the closest subframe. That is, in case the subframe index for the channel status information is 5, the possible closest index of indexes subsequent to index 5—index 7—may be selected. Further, in case the subframe index for the channel status information is 10, the possible closest index of indexes subsequent to index 10—index 11—may be selected.

Unlike the above-described method, if subframe patterns assigned for the backhaul link are fixed, a unique transmission method may be designated for each subframe pattern. That is, a specific subframe pattern may be defined again for each pattern and for each period, and channel status information (FBI, SRS, or SR) may be transmitted through the corresponding subframe.

Although the examples of FIGS. 6 to 9 have been described based on communication between a relay station and a base station, the technical features suggested in FIGS. 6 to 9 may also be applicable to communication between a base station and a terminal. For example, the base station may configure downlink subframes assigned for additional control information such as E-PDCCH (Extended-PDCCH) for the terminal. In such case, channel status information (CSI) is transmitted through an uplink subframe corresponding to the corresponding downlink subframe, and in this case, only virtual indexes including only the corresponding uplink subframe may be used to transmit the channel status information. Further, in case the channel status information may be not transmitted at a predetermined period, the closest subframe may be used to transmit the channel status information.

Figure 10:
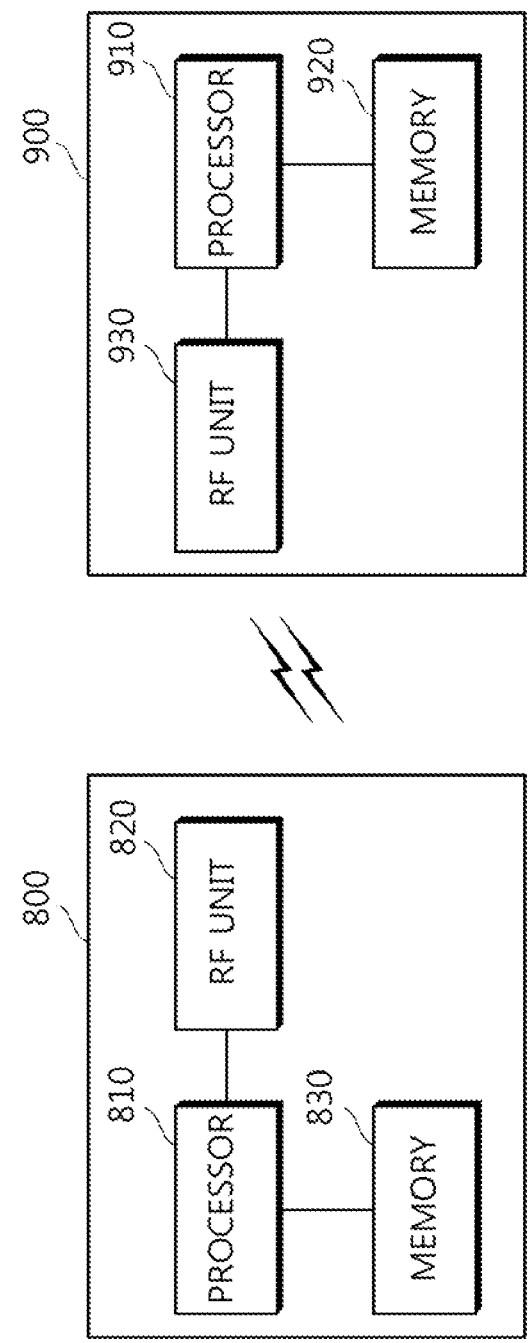
FIG. 10 illustrates a device to which the above-described method applies.

FIG. 10 illustrates a device to which the above-described methods apply. In FIG. 10, a transmitter 800 includes a processor 810, a memory 830, and an RF (Radio Frequency) unit 820. The transmitter 800 may be a base station, a relay station, or a terminal. The processor 810 may assign a radio resource in response information provided from the outside or information previously stored therein. In the embodiments described above, the procedures, schemes, or functions performed by the transmitter may be implemented by the processor 810. The memory 830 is connected to the processor 810 and stores various types of information to drive the processor 810. The RF unit 820 is connected to the processor 810 to transmit and/or receive radio signals.

A receiver 900 communicating with the transmitter includes a processor 910, a memory 920, and an RF unit 930. The receiver 900 may be a base station, a relay station, or a terminal. In the above-described embodiments, the procedures, schemes, or functions performed by the receiver may be implemented by the processor 910. The memory 920 is connected to the processor 910 and stores various types of information for driving the processor 910. The RF unit 930 is connected to the processor 910 to transmit and/or receive radio signals.

The processors 810 and 910 may include ASICs (application-specific integrated circuits), other chipsets, logic circuits and/or data processing devices. The memories 820 and 920 may include ROMs (Read-Only Memories), RAMs (Random Access Memories), flash memories, memory cards, storage media, and/or other storage devices. The RF units 830 and 930 may include base band circuits for processing radio signals. When the embodiments are implemented in software, the above-described schemes may be embodied in modules (procedures or functions) that perform the above-described functions. The modules may be stored in the memories 820 and 920 and may be executed by the processors 810 and 910. The memories 820 and 920 may be positioned in or outside the processors 810 and 910 and may be connected to the processors 810 and 910 via various well-known means.

The above-described methods and devices may be embodied in hardware, software or in combination thereof. When implemented in hardware, the methods and devises may be embodied as ASICs (application specific integrated circuits), DSPs (digital signal processors), PLDs (programmable logic devices), FPGAs (field programmable gate arrays), processors, controllers, microprocessors, other electronic units or combinations thereof, as designed to perform the above-described functions. When implemented in software, the embodiments may be embodied in modules that perform the above-described functions. The software may be stored in a memory unit and is executed by a processor. The memory unit or the processor may adopt various means well known to those skilled in the art.

Although the embodiments have been described above, it is understood by those skilled in the art that various modifications and alterations may be made thereto without departing from the scope defined by the following claims. Accordingly, the changes to the embodiments belong to the scope of the invention.

What is claimed is:

1. A method of transmitting control information in a radio communication system that uses a plurality of subframes including multiple OFDM symbols or SC-FDMA symbols, the method performed by a relay station and comprising:
- receiving bitmap information on a backhaul downlink subframe pattern indicating first downlink subframes;
- obtaining control information regarding non-Multicast Broadcast Single Frequency Network (MBSFN) subframes;
- receiving feedback information used for a channel status information (CSI) report of the relay station, wherein the feedback information indicates CSI report periodicity and a CSI subframe offset;
- determining second downlink subframes allocated for a backhaul link, wherein the second downlink subframes includes backhaul downlink subframes corresponding remaining subframes other than the non-MBSFN subframes among the first downlink subframes;
- determining uplink subframes by applying a fixed offset to the second downlink subframes;
- modifying the CSI report periodicity and the CSI subframe offset to enable the CSI report to be transmitted on at least one of the uplink subframes; and
- transmitting the CSI report based on the modified periodicity and the modified CSI subframe offset.

2. The method of claim 1, wherein the CSI report includes a Scheduling Request (SR), Channel Quality Indicator (CQI), Rank Indicator (RI), Precoding Matrix Indicator (PMI), and Sounding Reference Signal (SRS).

3. The method of claim 1, wherein the bitmap information is transmitted through radio resource control (RRC) signaling.

4. A relay station in a radio communication system that uses a plurality of subframes including multiple OFDM symbols or SC-FDMA symbols, the relay station comprising:
- a radio frequency circuit configured to transmit and receiving signals to a base station; and
- a processor coupled to the radio frequency circuit and configured to:
  - receive bitmap information on a backhaul downlink subframe pattern indicating first downlink subframes;
  - obtain control information regarding non-Multicast Broadcast Single Frequency Network (MBSFN) subframes;
  - receive feedback information used for a channel status information (CSI) report of the relay station, wherein the feedback information indicates CSI report periodicity and a CSI subframe offset;
  - determine second downlink subframes allocated for a backhaul link, wherein the second downlink subframes includes backhaul downlink subframes corresponding remaining subframes other than the non-MBSFN subframes among the first downlink subframes;
  - determine uplink subframes by applying a fixed offset to the second downlink subframes;
  - modify the CSI report periodicity and the CSI subframe offset to enable the CSI report to be transmitted on at least one of the uplink subframes; and
  - transmit the CSI report based on the modified periodicity and the modified CSI subframe offset.

* * * * *